United States Patent [19]

Krippl

[11] Patent Number: 4,900,593

[45] Date of Patent: Feb. 13, 1990

[54] PROCESS AND DEVICE FOR APPLYING A FREE-FLOWING REACTION MIXTURE

[75] Inventor: Kurt Krippl, Monheim, Fed. Rep. of Germany

[73] Assignee: Bayer Aktiengesellschaft, Bayerwerk, Fed. Rep. of Germany

[21] Appl. No.: 236,061

[22] Filed: Aug. 24, 1988

[30] Foreign Application Priority Data

Sep. 2, 1987 [DE] Fed. Rep. of Germany ....... 3729266

[51] Int. Cl.$^4$ .......................... B05D 1/00; B05C 5/00; B05C 11/10
[52] U.S. Cl. .................................... 427/420; 118/300; 118/694; 118/DIG. 4
[58] Field of Search ................ 118/DIG. 4, 300, 694; 427/420

[56] References Cited

U.S. PATENT DOCUMENTS

3,421,932  1/1969  McGregor, Jr. et al. .......... 427/420
3,513,017  5/1970  Waters et al. ............. 118/DIG. 4 X

*Primary Examiner*—Evan Lawrence
*Attorney, Agent, or Firm*—Joseph C. Gil

[57] ABSTRACT

The present invention relates to a process and device for applying a reaction mixture to a moving base. The key to the invention resides in the use of compressed air to ensure even distribution of the mixture. The reaction mixture is applied via an elongated pipe-like applicator vessel which extends laterally across the moving base. A cushion of compressed air is maintained in the applicator vessel above the reaction mixture.

3 Claims, 1 Drawing Sheet

PROCESS AND DEVICE FOR APPLYING A FREE-FLOWING REACTION MIXTURE

BACKGROUND OF THE INVENTION

The present invention relates to a process and a device for applying for a free-flowing reaction mixture which upon reaction forms a synthetic material, and in particular a foamed material, to a base. The reaction mixture is distributed within an elongated pipe-like applicator vessel extending laterally across the base. The applicator vessel has output orifices which open over the base.

In the manufacture of a variety of products, in particular foamed products, a free-flowing reaction mixture must be applied to a moving base in a thin layer of exactly identical thickness everywhere. It becomes increasingly difficult with increasing width of application to keep the thickness of the thin layer even at all points. Due to the high viscosity of the reaction mixture and the long flow distance from the mixer to the applicator vessel and within the applicator vessel itself, varying pressures prevail at the output orifices. This leads to the result that varying quantities flow out of the output orifices and the applied layer is correspondingly uneven.

The object of the present invention consists in creating a process and a device with which an even application of the reaction mixture across the full breadth of application is attained.

BRIEF DESCRIPTION OF THE DRAWING

The FIGURE illustrates the present invention schematically.

DESCRIPTION OF THE INVENTION

Figure 1:
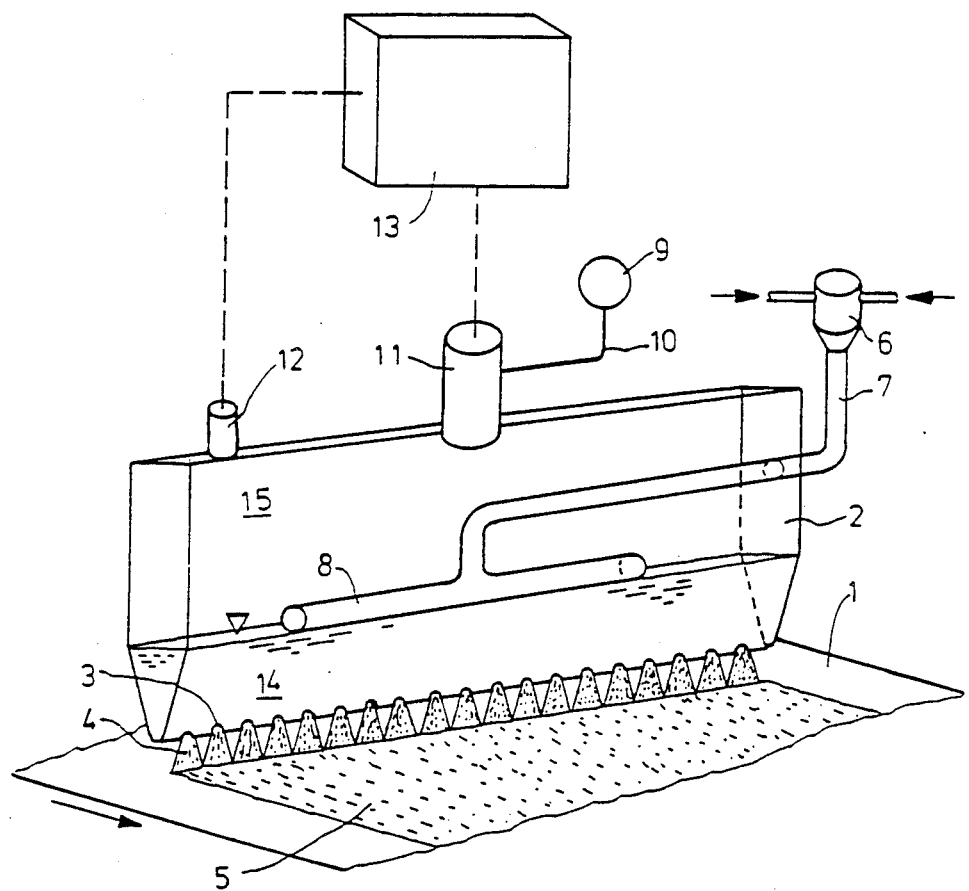

The above object is solved by maintaining a minimum level of reaction mixture and above that a cushion of compressed air in the applicator vessel.

By using the cushion of compressed air, the same pressure prevails in all output orifices and thus the same quantity of reaction mixture per unit of time also flows out. In turn, an even thickness of the layer of reaction mixture is applied to the moving base. Of course, instead of a cushion of compressed air a cushion of a different compressed gas, e.g. inert gas, may be applied. If a pressure above 2 bar is maintained in the applicator vessel, then this is particularly advantageous if gas-loaded reaction components forming foamed materials are processed. The gas contained in the reaction mixture then remains in solution and is available for nucleation to produce a fine foamed material cell size.

The pressure in the applicator container is preferably regulated across the air cushion depending upon the level of the reaction mixture in the container. This embodiment is particularly advantageous, because variations of the level in the applicator container are thus compensated during operational disturbances.

The new device for applying the free-flowing reaction mixture to a moving base comprises a hollow, elongated applicator vessel, provided with at least one output orifice, arranged downstream of a mixing device. The novelty consists in that the applicator vessel is connected via a compressed air main to a compressed air source. In this way it is possible to arrange for a cushion of compressed air in the interior of the applicator vessel, in order to achieve the result described in connection with the new process.

In order to be able to regulate the pressure within the applicator vessel depending on the level of reaction mixture, a control valve is arranged in the compressed air main, which, together with a level indicator in the applicator vessel and a control unit, represents a control circuit.

In the diagram, the new device is represented schematically in perspective view. A device for feeding a free-flowing reaction mixture, which preferably forms a polyurethane foamed material, is arranged above a paper sheet as a moving base 1 conveyed on laminator (not shown). The device comprises an applicator vessel 2 (represented as transparent for greater clarity), which extends laterally across the base 1 at a vertical distance. The device has, in its lower region, output orifices 3, from which the reaction mixture exits and forms into a curtain 4, from which a layer 5 forms on the moving base. The reaction mixture, flowing from a mixer casing 6, from the components polyol and isocyanate arrives via a supply main 7 at a predistributing pipe 8 arranged within the applicator vessel 2. In addition, a compressed air supply main 10 connected with a compressed air source 9 feeds into the applicator vessel 2 above the liquid level. A pressure control valve 11 is arranged in it, which control valve, together with a level indicator 12, designed as a proximity indicator, arranged in the applicator vessel 2, and a regulator 13 forms a control circuit, by which means the pressure in the vessel 2 is adjusted depending on the level in such a manner that the output quantity from the output orifices always remains constant. The cushion of compressed air present above the filling 14 of reaction mixture in the applicator vessel 2 is indicated by 15.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for applying a free-flowing reaction mixture in the form of a curtain onto a moving base comprising distributing the reaction mixture which forms the curtain within an elongated pipe-like applicator vessel extending laterally across the base, which vessel has output orifices facing said base and maintaining a minimum level of reaction mixture and above that a cushion of compressed air in said applicator vessel.

2. The process of claim 1, characterized in that the pressure in the applicator vessel is regulated across the cushion of compressed air depending upon the level of the reaction mixture in said vessel.

3. A device for applying a free-flowing reaction mixture onto a moving base comprising a hollow, elongated applicator vessel provided with at least one outlet orifice, said vessel arranged downstream of a mixing device, wherein said applicator vessel is connected via a compressed air main to a compressed air source, and wherein a control valve is arranged in the compressed air main, which, together with a level indicator in the applicator vessel and a pressure regulator, forms a control circuit, whereby the pressure in said vessel is adjusted depending upon the level of reaction mixture in said vessel.

* * * * *